United States Patent
Da Silva et al.

(10) Patent No.: US 9,342,080 B2
(45) Date of Patent: May 17, 2016

(54) THERMOSTATIC CARTRIDGE FOR REGULATING HOT AND COLD FLUIDS TO BE MIXED

(71) Applicant: VERNET, Ollainville (FR)

(72) Inventors: William Da Silva, Ollainville (FR); Emmanuel Platet, Lardy (FR)

(73) Assignee: VERNET, Ollainville (FR)

( * ) Notice: Subject to any disclaimer, the term of this patent is extended or adjusted under 35 U.S.C. 154(b) by 426 days.

(21) Appl. No.: 13/824,988

(22) PCT Filed: Dec. 6, 2012

(86) PCT No.: PCT/EP2012/074662
§ 371 (c)(1),
(2) Date: Sep. 25, 2013

(87) PCT Pub. No.: WO2013/083703
PCT Pub. Date: Jun. 13, 2013

(65) Prior Publication Data
US 2014/0124586 A1 May 8, 2014

(30) Foreign Application Priority Data
Dec. 7, 2011 (FR) .................................... 11 61287

(51) Int. Cl.
*G05D 23/13* (2006.01)
*G05D 23/01* (2006.01)

(52) U.S. Cl.
CPC ............ *G05D 23/01* (2013.01); *G05D 23/1346* (2013.01)

(58) Field of Classification Search
CPC ..... G05D 23/01; G05D 23/02; G05D 23/021; G05D 23/022; G05D 23/13; G05D 23/132; G05D 23/1346

USPC ........................................................ 236/12.1
See application file for complete search history.

(56) References Cited

U.S. PATENT DOCUMENTS

| 5,148,976 A * | 9/1992 | Reid ................. G05D 23/1346 236/12.2 |
| 2004/0089728 A1 | 5/2004 | Nember |

(Continued)

FOREIGN PATENT DOCUMENTS

| CN | 1038867 | 1/1990 |
| EP | 0 187 378 A2 | 7/1986 |

(Continued)

OTHER PUBLICATIONS

International Search Search Report issued on Jan. 23, 2012 for International Application No. PCT/EP2012/074662.

*Primary Examiner* — Marc Norman
(74) *Attorney, Agent, or Firm* — Knobbe, Martens, Olson & Bear, LLP

(57) ABSTRACT

A cartridge comprising a slide valve for regulating the temperature of a mixture of hot and cold fluids is provided. The slide valve is, under the action of a thermostatic element and with respect to an external casing of the cartridge, movable along the central axis of the casing so as to inversely vary the respective cross sections of flow of a cold-fluid inlet and a hot-fluid inlet. Therefore the cartridge can, in an economical and easy manner, regulate high flows of hot fluid and/or cold fluid. The slide valve delimits externally a groove for channelling hot fluid, which can distribute the supply of hot fluid from the hot-fluid inlet over the entire external periphery of the slide valve, and/or a groove for channelling cold fluid which can distribute the supply of cold fluid from the cold-fluid inlet over the entire external periphery of the slide valve.

17 Claims, 3 Drawing Sheets

(56) References Cited

U.S. PATENT DOCUMENTS

2004/0238650 A1* 12/2004 Luig .................. G05D 23/1346 236/12.11
2014/0361091 A1* 12/2014 Da Silva ............ G05D 23/1346 236/12.21

FOREIGN PATENT DOCUMENTS

| EP | 1 496 415 A2 | 1/2005 |
| FR | 2 869 087 A1 | 10/2005 |
| FR | 2 921 709 A1 | 4/2009 |
| WO | WO 89/12147 | 12/1989 |

* cited by examiner

THERMOSTATIC CARTRIDGE FOR REGULATING HOT AND COLD FLUIDS TO BE MIXED

CROSS REFERENCE TO RELATED APPLICATIONS

This application is the U.S. National Phase of International Application No. PCT/EP2012/074662, filed Dec. 6, 2012, designating the U.S. which claims the benefit of French Patent Application No. 11 61287 filed Dec. 7, 2011.

FIELD OF THE INVENTION

The present invention concerns a thermostatic cartridge for regulating hot and cold fluids to be mixed, in particular hot water and cold water in a sanitary installation.

BACKGROUND OF THE INVENTION

In this type of cartridge, the thermostatic regulation is generally obtained by means of an expandable thermostatic element comprising firstly a piston normally fixed with respect to the hollow external casing of the cartridge and secondly a body secured to a regulation slide valve. This slide valve is movable with respect to the casing of the cartridge so as to inversely vary the cross sections of flow of the two fluids, referred to as "hot fluid" and "cold fluid", supplying the cartridge with a view to mixing these fluids in variable proportions in order to obtain, downstream from the slide valve, a fluid referred to as "mixed fluid", which flows along a thermosensitive part of the thermostatic element and leaves the cartridge. By modifying the position of the piston with respect to the casing, generally by means of an ad hoc adjustment mechanism, the thermostatic regulation temperature is fixed, that is to say the balancing temperature around which the temperature of the mixed fluid is regulated. An example of this type of cartridge is provided by EP-A-1 496 415, on which the preamble of the accompanying claim 1 is based.

In practice, the movements of the slide valve between two extreme positions, respectively for which the flow of hot fluid is completely closed and the flow of cold fluid is completely closed, are around a few millimeters only in cartridges of standard dimensions. As a result the maximum flows of hot fluid and cold fluid that can be admitted into these cartridges are limited. This limitation of the flows of hot fluid and cold fluid is accentuated by the fact that the arrival of these fluids at the regulation slide valve is concentrated on limited respective portions of the external periphery of the slide valve: this is because the hot and cold fluids, in having been brought to the slide valve, have passed through the casing of the cartridge, while taking account of the environment, more or less constrained, in which the cartridge is to be installed. In order to get round this difficulty, hollowing out, in the internal face of the cartridge casing, peripheral grooves for supplying the slide valve with fluid is known, the hot fluid and cold fluid inlets emerging respectively in such grooves. However, in practice, this solution remains expensive to implement and especially it tends to reduce the inside diameter of the casing in favour of its thickness for hollowing out the aforementioned grooves, which in particular limits the outside diameter of the slide valve and thereby limits the maximum flows of fluid that can be regulated by this slide valve. Moreover, in some cases and/or for some cartridge casings, the presence of such internal grooves cannot be envisaged technically.

SUMMARY OF INVENTION

The aim of the present invention is to propose a regulation cartridge that can, in an economical and easy fashion, regulate high flows of hot and cold fluids to be mixed.

To this end, the subject matter of the invention is a thermostatic cartridge for regulating hot and cold fluids to be mixed, as defined in claim 1.

One of the ideas at the basis of the invention is, without having to touch the casing of the cartridge, to seek to cause one or other or both of the hot and cold fluids to flow all around the slide valve, so that these fluids supply the inside of the casing from the entire periphery of this slide valve. To do this, the outside of the slide valve of the cartridge according to the invention provides, for at least one, or even advantageously for each of the fluids to be mixed, a groove for flow of the fluid all around the slide valve: this flow groove is, in particular through its sizing and positioning, designed both to distribute, substantially homogeneously over the entire external periphery of the slide valve, the fluid supplying the corresponding inlet, delimited between the casing and one of the axial faces of the slide valve, and to saturate this inlet under normal conditions of supply of the cartridge. According to the invention, most or even almost all the supply of this inlet of hot fluid or cold fluid comes directly from the corresponding channelling groove, in the sense that the peripheral portion or portions of the fluid inlet, outside which there is situated the opening for the corresponding fluid inlet through the casing and which are therefore, where applicable, very extensive, are, via the channelling groove, just as supplied with fluid as the portion or portions, where applicable restricted, of this fluid inlet, at which the fluid inlet emerges. As the free volume of the or each channelling groove according to the invention is sized so as to be sufficiently large to saturate the fluid inlet associated with the groove, and as the entire external periphery of the slide valve participates to the same extent in the supply of this fluid inlet, the result is that a high flow of fluid can be passed through this fluid inlet. In other words, compared with a slide valve of a cartridge of the prior art, with no channelling grooves, the slide valve of the cartridge according to the invention makes it possible to increase the maximum permissible flow of one of the or even both of the fluids to be mixed, for an equal size of the cartridges.

Additional advantageous features of the cartridge according to the invention are specified in dependent claims 2 to 9.

BRIEF DESCRIPTION OF THE DRAWINGS

The invention will be better understood from a reading of the following description, given solely by way of example and made with reference to the drawings, in which.

DETAILED DESCRIPTION OF THE EMBODIMENTS

Figure 1:
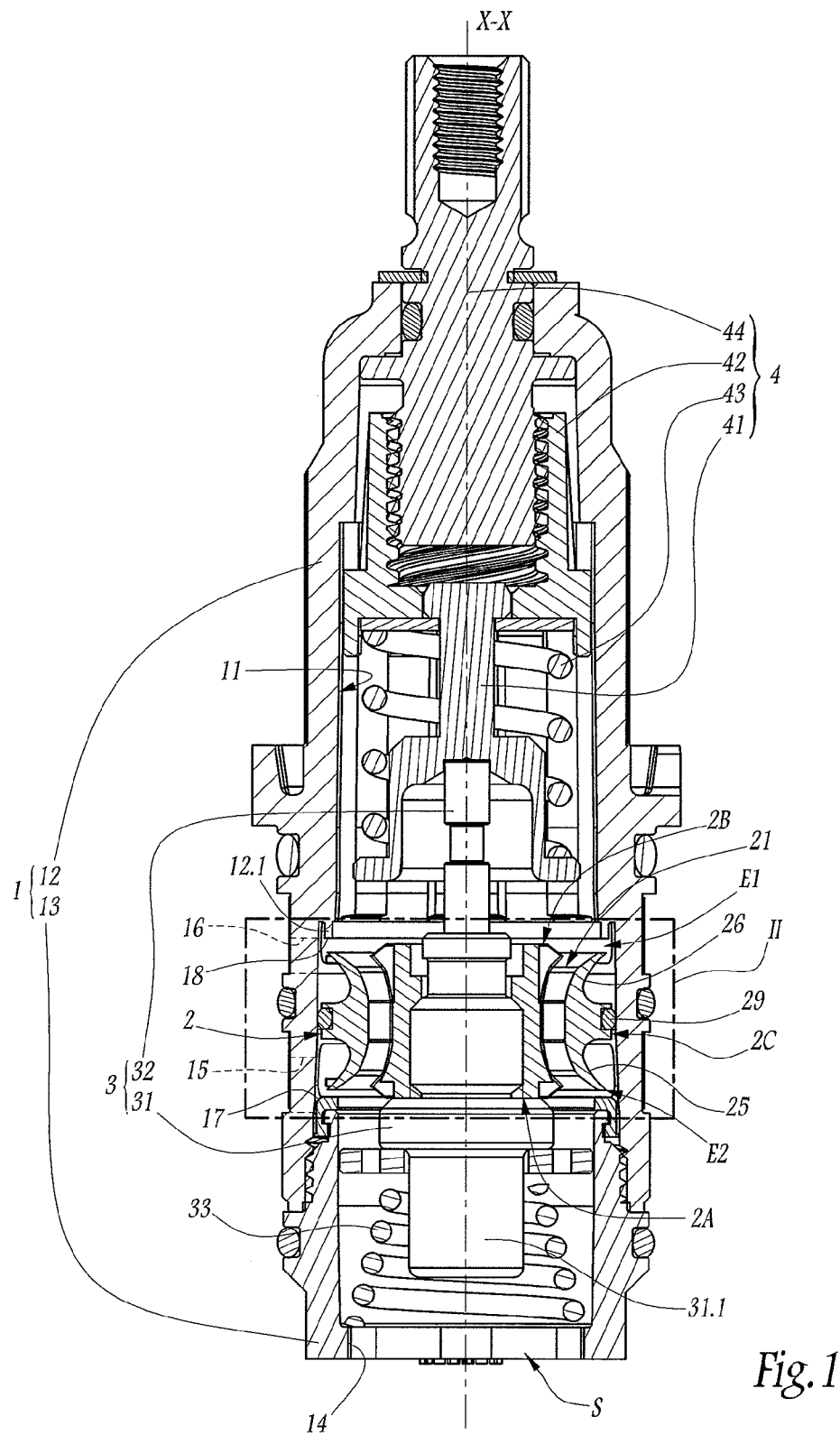
FIG. 1 is a schematic longitudinal section of a cartridge according to the invention.
Figure 2:
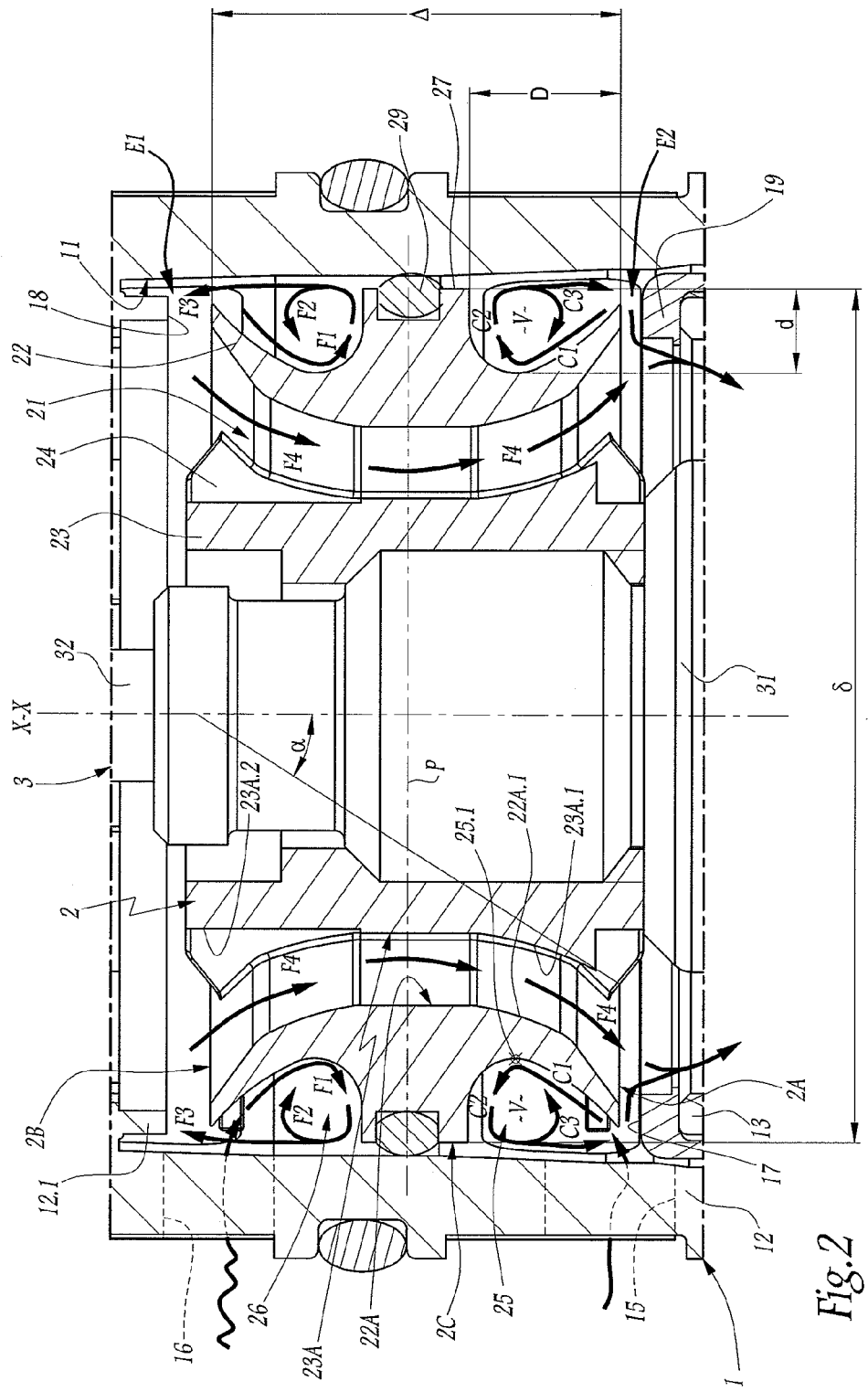
FIG. 2 is a view to a larger scale of the framed area II in FIG. 1.

FIGS. 1 and 2 show a thermostatic cartridge arranged around and along a central axis X-X. This cartridge is suitable for equipping a hot water and cold water mixer tap, not shown as such in the figures, or more generally for equipping a sanitary installation.

The cartridge comprises, as the main external component, a hollow external casing 1. This casing 1 has a roughly tubular shape, which is centred on the axis X-X and delimits internally a central longitudinal channel 11.

For convenience, the remainder of the description is directed with respect to the axis X-X, in that the terms "upper" and "top" correspond to an axial orientation turned towards the top part of FIGS. 1 and 2, while the terms "lower" and "bottom" correspond to an opposite axial direction.

The casing 1 comprises a top housing 12 at the bottom end of which a socket 13 is screwed. The internal channel 11 extends both along the housing 12 and the socket 13 and emerges at the bottom on the outside, through an opening 14 in the socket, which, in the example embodiment considered in the figures, is centred on the axis X-X. The housing 12 and the socket 13 are intended to be mounted sealingly in the body of the aforementioned mixer tap, with the interposition of O-ring seals visible in FIG. 1. It will be noted that, in the example embodiment considered in the figures, the housing 12 is a single piece, it being understood that, in a variant not shown, this housing may be formed by several parts fixedly secured to one another by any appropriate means, in the same way as the socket 13 is fixedly secured to the housing 12.

The wall of the housing 12 has lateral passages 15 and 16 passing right through this wall in order to connect the outside of the casing 1 to the internal channel 11. The passage 15 is offset axially along the housing 12 with respect to the passage 16. In practice, each of the lateral passages 15 and 16 is in a form not limitative of the present invention: by way of example, each of the passages 15 and 16 may be in the form of a circular hole, passing radially right through the wall of the housing 12; or each of these passages 15 and 16 includes one or more through apertures, extending in arcs of a circumference centred on the axis X-X; or each of these passages 15 and 16 extends, at least partly, axially in the thickness of the wall of the housing 12, emerging outside this wall, via one or more orifices of various geometries, at an axial level different from that where the passage emerges inside the housing 12, also via one or more orifices with diverse geometries.

In all cases, the lower passage 15 constitutes a hot-water inlet while the upper passage 16 constitutes a cold-water inlet.

The cartridge also comprises a slide valve 2 mounted so as to be able to move along the axis X-X between two extreme positions, namely:

a low extreme position in which the lower axial face 2A of the slide valve 2 is in abutment against an annular seat 17, which is carried fixedly by the casing 1 and is situated, along the axis X-X, substantially level with the outlet of the passage 15 in the housing 12, and a high extreme position in which the upper axial face 2B of the slide valve 2 is in abutment against an annular seat 18, which is carried fixedly by the casing 1 and is situated, along the axis X-X, substantially level with the outlet of the passage 16 in the housing 12.

In practice, in the example embodiment considered in the figures, the lower seat 17 is formed by the top end edge of a gasket 19 attached fixedly to the upper end of the socket 13, while the upper seat 18 is formed by the lower end edge of a shouldered part 12.1 of the housing 12.

Since the total axial dimension of the slide valve 2, separating its opposite faces 2A and 2B from each other and denoted A in FIG. 2, is less than the axial distance separating the seats 17 and 18 from each other, it will be understood that, when the slide valve 2 is in its low extreme position, the slide valve closes off the admission of hot water in the seat 17 while opening a cold-water inlet E1 to the maximum extent, which is delimited axially between the top face 2B of the slide valve 2 and the seat 18. Conversely, when the slide valve 2 is in its high extreme position, the slide valve closes off the admission of cold water in the seat 18, while opening a hot-water inlet E2 to the maximum extent, which is delimited axially between the bottom face 2A of the slid 2 and the seat 17. Naturally, according to the placing of the slide valve 2 along the axis X-X between these high and low extreme positions, the respective cross sections of flow of the cold-water inlet E1 and hot-water inlet E2 vary inversely, which amounts to stating that the quantities of cold water and hot water admitted in the seats 17 and 18 are regulated, in inverse respective proportions, by the slide valve 2 according to its axial position. In FIGS. 1 and 2, the slide valve 2 occupies an intermediate position between its high and low extreme positions.

The slide valve is mounted so as to be able to move in the housing 12, so that its external lateral face 2C is received so as to be substantially close-fitting in the part of the internal channel 11, on either side of which the hot-water 15 and cold-water 16 inlet passages are situated. A peripheral seal 29, radially interposed between the external lateral face 2C of the slide valve and the internal face of the aforementioned part of the channel 11, makes the passages 15 and 16 outside the slide valve 12 watertight with respect to each other. So that the cold water admitted in the seat 18 can join and mix with the hot water admitted in the seat 17, then forming a mixture of cold water and hot water flowing, downstream from the slide valve, as far as the opening 14, which constitutes an outlet S for this mixture, the slide valve 2 delimits internally a flow passage 21 connecting the opposite faces 2A and 2B to each other. This flow passage 21, as well as other features of the slide valve 2, will be detailed a little later.

To drive the slide valve 2 and thus control its axial position, the cartridge comprises a thermostatic element 3 the body 31 of which, centred on the axis X-X, is fixedly secured to the slide valve 2. This body 31 contains a heat-expandable material, which, under the action of the heat of the mixture between the hot water and cold water, flowing downstream from the slide valve 2 along a thermosensitive part 31.1 of the body 31, expands and causes a relative movement, in translation along the axis X-X, of a piston 32 of the thermostatic element 3, centred on the axis X-X. The end part of the piston 32, opposite the body 31, is for its part connected to the casing 1 by a mechanical assembly 4, known per se and able to adjust the axial height of the piston 32 with respect to the casing 1, independently of the relative position of the body 31.

In the example embodiment considered in the figures, the end of the piston 32, opposite to the body 31, is pressed against a stop 41 mounted so as to be able to slide valve, along the axis X-X, in a nut 42, with the axial interposition of an overtravel spring 43. The axial position of the nut 42 in the casing 1, and thereby the height of the piston stop 41, can be modified by an adjustment screw 44, which is centred on the axis X-X and the top end of which is fluted so as to be able to be rotationally connected with a manoeuvring handle, not shown in the figures. At its bottom end, this adjustment screw 44 is screwed in the nut 42, the latter being rotationally connected about the axis X-X to the housing 12, typically by flutes. Thus, when the screw 44 is driven in rotation on itself about the axis X-X, the nut 42 translates along this axis, which causes the corresponding driving of the stop 41 by means of the spring 43. In addition, the thermostatic element 3 is associated with a return spring 33, which acts on the slide valve 2 in an opposite manner to the deployment of the piston 32 with respect to the body 31 of the thermostatic element and is axially interposed between this slide valve and the lower socket 13 of the casing 1.

The structure and functioning of the mechanical assembly 4 will not be described any further here, since the reader can, for this purpose, refer to FR-A-2 869 087 in the name of the same applicant as these presents. The embodiment of this mechanism 4 is not limitative of the invention: other embodiments are known in the art, for example in FR-2 921 709, FR-2 774 740 and FR-2 870 611. Moreover, by way of a variant that is not shown, if no attempt is made to be able to regulate the value of the temperature at which the slide valve regulates the mixing of hot and cold water, the assembly 4 can be omitted from the cartridge, the piston 32 then being fixedly connected to the casing 1.

Figure 3:
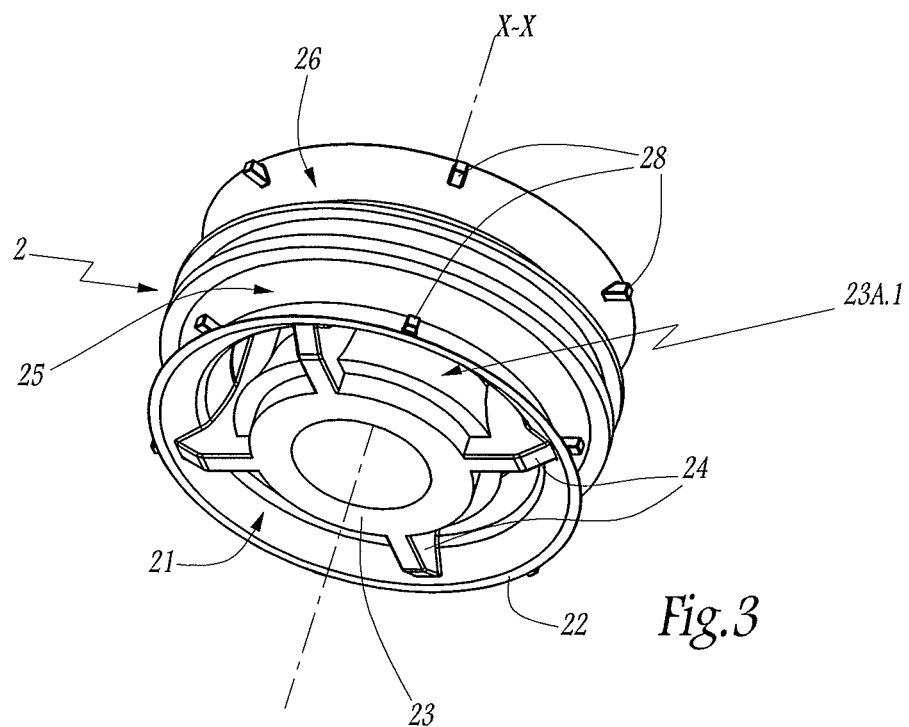
FIGS. 3 and 4 are views in perspective, at different angles, of the slide valve, shown alone, forming part of the cartridge of FIG. 1.
Figure 4:
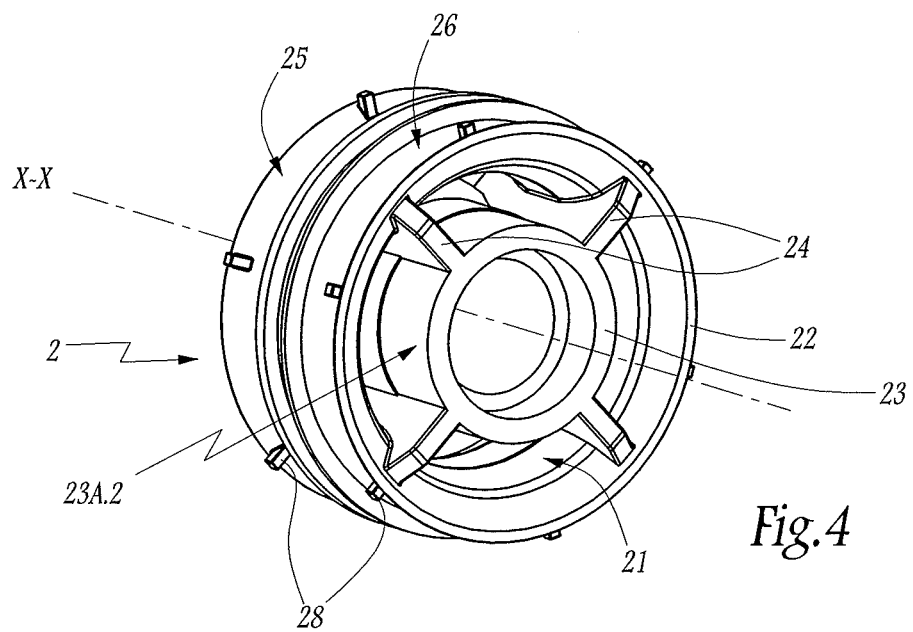

Returning now to the detailed description of the slide valve 2, it will noted that, as clearly visible in FIGS. 2 to 4, the body of this slide valve comprises two roughly annular parts, which are concentric while being centred on the axis X-X, the external body part being referenced 22 while the internal body part is referenced 23. The body parts 22 and 23 delimit radially between them the aforementioned flow passage 21, it being noted that the arms or ribs 24, which are distributed around the axis X-X and are four in number in the example in the figures, each extend radially between the body parts 22 and 23 and thus connect them fixedly to each other: as a result the flow passage 21 consists conjointly of the four free spaces separating the arms 24 in pairs on the periphery of the slide valve. Advantageously, as in the example embodiment considered in the figures, the external body part 22, the internal body part 23 and the arms 24 are made in one piece with one another, thus constituting the slide valve 2 in a single piece, the latter being for example obtained by moulding.

The respective top end edges of the body parts 22 and 23 belong to the face 2B of the slide valve, while the respective bottom end edges of these body parts 22 and 23 belong to the face 2A of the slide valve. The external lateral face 2C of the slide valve consists essentially of the lateral face of the body part 22, which is radially opposite to the body part 23. The lateral face of the body part 23, which is radially opposite to the body part 22, is arranged to receive the thermostatic element, in particular in order to fix thereto the body 31 of the latter, in particular by screwing.

Dealing further with external arrangements of the slide valve 2, it should be noted that the external body part 22 delimits externally two grooves, respectively bottom 25 and top 26. The grooves 25 and 26 are separated axially from each other by a main part 27 that belongs to the external lateral face 2C of the slide valve 2, extending on either side of a transverse mid-plane P of the slide valve 2, which is perpendicular to the axis X-X. This main part 27 is provided externally with the gasket 29 forming, substantially in the plane P, a peripheral sealing line with respect to the housing 12. In the example embodiment considered here, these external grooves 25 and 26 are substantially symmetrical with each other with respect to the transverse mid-plane P of the slide valve 2: under these circumstances, the bottom groove 25 will be described below in detail, it being understood that the same description is applicable to the top groove 26, by reversing the terms top and bottom or the like.

Thus the groove 25 runs over the entire external periphery of the body part 22 of the slide valve 2. This groove 25 emerges both on the lateral face 2C and on the bottom face 2A of the slide valve. More precisely, as clearly visible in FIGS. 2 and 3, the groove 25 emerges radially on the bottom end part of the lateral face 2C. In addition, the groove 25 emerges axially on the external periphery of the lower axial face 2A.

In the embodiment considered here, the groove 25 has, in axial section as in FIG. 2, a concave profile that is substantially constant over the entire periphery of the body part 22 and connects the external lateral face 2C to the lower axial face 2A of the slide valve 2, passing through a bottom 25.1 of the groove 25, which constitutes the peripheral zone of the groove closest radially to the axis X-X. Advantageously, for reasons that will emerge later, the concave profile of the groove 25 is more splayed on the side of the lower axial face 2A of the slide valve 2: more precisely, the upper part of the concave profile connecting the bottom 25.1 to the external lateral face 2C has a lesser axial dimension and a more marked local curvature than the lower profile part connecting the bottom 25.1 to the bottom face 2A.

By way of advantageous sizings, the interest of which will emerge later, it should be noted that the axial dimension, denoted D in FIG. 2, of the outlet of the groove 25 on the lateral face 2C is designed to be large vis-à-vis the total axial half-dimension of the slide valve 2: thus this axial dimension D is advantageously equal to at least 40% of the total axial dimension A of the slide valve. In addition, the radial depth of the bottom 25.1, or in other words the maximum radial dimension of the groove 25 vis-à-vis the lateral face 2C, which is denoted d in FIG. 2, is equal to at least 5% of the maximum transverse dimension of the slide valve 2, or in other words at least 5% of the external diameter of the slide valve.

When the cartridge is in service, the hot water arriving through the passage 15 is channelled by the groove 25 when it reaches the external periphery of the slide valve 2, as indicated on the arrows C1 in FIG. 2. Thus this hot water fills the free space V of the groove 25, that is to say its free volume delimited in the thickness of the external body part 22 of the slide valve 2, and flows in the groove 25 all around the slide valve 2. The concave profile of the groove facilitates this filling, forcing most of the hot water to join and swirl towards the bottom 25.1 of the groove 25 as indicated by the arrows C2 in FIG. 2. Provided that the hot-water inlet E2 is not closed by the slide valve 2 in abutment against the seat 17, hot water, coming from the groove 25, then supplies the inlet E2 over the entire external periphery of the slide valve 2, as indicated by the arrows C3 in FIG. 2. It will be understood that, at any point on the external periphery of the slide valve 2, the supply of hot water to the inlet E2 through the groove 25 is effective and even: thus, by virtue of the fact that, over the entire external periphery of the slide valve, or in other words both radially facing the passage 15 and outside this passage along the periphery of the housing 12, the groove 25 supplies the inlet E2 with a constant quantity of hot water, the most hot water possible, for a given axial position of the slide valve 2, is successively admitted inside the seat 17.

The groove 25 is designed thus to supply hot water sufficiently to the inlet E2 to saturate it when a sufficient flow of hot water supplies the passage 15 from the outside of the cartridge, typically under normal conditions of supplying the cartridge: this effect of maximum supply of the hot-water inlet E2 is guaranteed for the entire regulation range for the slide valve 2 when the groove 25 is sized so that its free space V is at least equal to or even greater than the maximum volume of hot water that the inlet E2 can admit while the cold-water inlet E1 is completely closed off. Such a sizing of the volume V of the groove 25 is in particular achieved by the values of d and D specified above.

All the above considerations in relation to the grove channelling hot water 25 are transposed to the groove 26 channelling cold water. In other words, the cold water arriving in the passage 16 fills the free space of the groove 26, being distributed all around the slide valve 2, so as to distribute the supply to the cold-water inlet E1 over the entire external periphery of the slide valve, as indicated by the arrows F1, F2 and F3, respectively similar to the arrows C1, C2 and C3 for the hot water.

Moreover, as mentioned above, during movements along the axis X-X of the slide valve 2 with respect to the casing 1, the main part 27, which sealingly separates the grooves 25 and 26, guides the movements of the slide valve by close-fitting sliding inside the housing 12. Advantageously, to reinforce this guidance of the slide valve 2 in movement, in particular in the vicinity of the opposite axial faces 2A and 2B of the slide valve, the grooves 25 and 26 are respectively provided with projecting studs 28. These studs are distributed in a substantially uniform manner along the external periphery of the slide valve 2, without thus causing any significant limitations for the hot water or cold water flowing in the grooves 25 and 26, between these studs 28. For the studs 28 to actually ensure a taking up of the external guidance of the movements of the slide valve 2, it will be understood that each of them extends radially projecting from the outlet of the grooves 25 and 26 on the external lateral face 2C of the slide valve 2, as clearly visible in FIG. 2. In this way, the free radial end of each of the studs 28 is able to be pressed against the internal face of the wall of the housing 12, in particular in the case where, during its movements with respect to the casing 1, the slide valve 2 tends to incline slightly with respect to the axis X-X.

Independently of the considerations detailed up until now in relation to the grooves 25 and 26, the slide valve 2 has specific arrangements concerning its flow passage 21, aimed at improving the quality and/or speed of the thermostatic regulation, by homogenisation of the mixture of hot water and cold water downstream from the slide valve 2, or in other words before this mixture reaches the thermosensitive part 31.1 of the body 31 of the thermostatic element 3. To do this, as clearly visible in FIG. 2, the face 23A, radially opposite the external body part 22, presented by the internal body part 23, is, in its bottom part, conformed so as to force the flow of cold water, flowing in the flow passage 21, to be directed to the hot-water inlet E2, until this flow of cold water, emerging from the passage 21, is sent directly to the hot-water inlet E2, as indicated by the arrows F4 in FIG. 2: it will then be understood that, just downstream from the hot-water inlet E2, the cold water emerging from the flow passage 21 and directed by the lower part of the face 23A of the part of the internal body 23, transversely breaks the flow of hot water, the mixing between the hot water and the cold water then exhibiting turbulences by means of which the temperature of the mixture is rapidly made uniform.

In the example embodiment considered in the figures, the aforementioned lower part of the face 23A of the internal body part 23 constitutes a surface 23A.1 able to guide over the hot-water inlet E2 the cold water flowing in the flow passage 21. This guide surface 23A.1 emerges on the lower axial face 2A of the slide valve 2 and runs over the entire periphery of the internal body part 23, except at the peripheral levels of the arms 24, as clearly visible in FIG. 3.

In the example embodiment considered in the figures, the guide surface 23A.1 has, in axial section, a concave profile that is substantially constant over the entire periphery of the internal body part 23. Advantageously, at the lower end of this concave profile, the geometric straight line tangent to this concave profile is inclined by an angle, denoted α in FIG. 2, with respect to the axis X-X, this angle α lying between 30° and 60°: in this way, the cold water emerging from the flow passage 21 is directed to the hot-water inlet E2, with complementary angulation, between 60° and 30°, with respect to the plane of the seat 17.

Also advantageously, the curvature of the concave profile of the guide surface 23A.1 is designed to increase progressively in the direction of flow of the cold water in the flow passage 21: in this way, by ramp effect, the cold water emerging from the passage 21 is accelerated.

In order among other things not to create any resistance for the flow of cold water when it is guided by the surface 23A.1, the face 22A of the external body part 22, delimiting the flow passage 21, includes a surface 22A.1 radially opposite the guide surface 23A.1, this surface 22A.1 having, in axial section, substantially the same profile as the guide surface 23A.1.

Advantageously, for reasons related in particular to the constraints involved in removing the slide valve 2 from the mould, it should be noted that the top part of the face 23A of the internal body part 23 extends the guide surface 23A.1 upwards, not according to the same profile as this guide surface but with a rectilinear profile substantially parallel to the axis X-X. This amounts to saying that the guide surface 23A.1 is connected to the upper axial face 2B of the slide valve 2 by a substantially cylindrical surface 23A.2, centred on the axis X-X, which constitutes the top part of the face 23A of the internal body part 23.

Naturally the invention is not limited to the embodiment described and depicted above, since various variants and options can be envisaged without departing from the scope of this invention.

What is claimed is:

1. A thermostatic cartridge for regulating hot and cold fluids to be mixed, comprising:
   a casing that is hollow, defines an axis and delimits an outlet for a mixture of the hot and cold fluids,
   a slide valve for regulating the temperature of the mixture, which:
      has two opposite axial faces,
      delimits internally a flow passage that connects the axial faces to each other and through which one of the hot and cold fluids joins the other fluid in the direction of the outlet in order to form the mixture, and
      is movable substantially along the axis with respect to the casing so as to inversely vary the respective flow sections of a cold fluid inlet, delimited axially between the casing and one of the axial faces, and a hot-fluid inlet, delimited axially between the casing and the other axial face, and
   a thermostatic element that comprises a piston, connected to the casing, and a body secured to the slide valve, the piston and the body being able to move with respect to each other substantially along the axis under the action of an expansion of a heat-expandable material contained in the body along a thermosensitive part from which the mixture flows downstream from the slide valve,
   wherein the slide valve delimits externally:
   a hot channelling groove for channelling the hot fluid, which is adapted to distribute the hot fluid supplying the hot-fluid inlet over the entire external periphery of the slide valve and defines a hot free space for circulating the hot fluid around the slide valve, the hot free space being equal to or greater than the maximum volume of fluid that is permitted in service by the hot fluid inlet, and
   a cold channelling groove for channelling the cold fluid, which is adapted to distribute the cold fluid supplying the cold fluid inlet over the entire external periphery of the slide valve and defines a cold free space for circulating the cold fluid around the slide valve, the cold free space being equal to or greater than the maximum volume of fluid that is permissible in service through the cold fluid inlet.

2. The thermostatic cartridge according to claim 1, wherein at least one of or each of the hot and cold channelling grooves emerges both:
   axially on the external periphery of the axial face of the slide valve, associated with the corresponding hot or cold fluid inlet, and
   radially on the end part, turned axially towards said axial face, of the external lateral face of the slide valve.

3. The thermostatic cartridge according to claim 2, wherein at least one of or each of the hot and cold channelling grooves has a maximum radial dimension that is equal to at least 5% of the maximum transverse dimension of the slide valve.

4. The thermostatic cartridge according to claim 2, wherein at least one of or each of the hot and cold channelling grooves has, at its outlet on the external lateral face of the slide valve, an axial dimension that is equal to at least 40% of the total axial dimension of the slide valve.

5. The thermostatic cartridge according to claim 1, wherein at least one of or each of the hot and cold channelling grooves has, in axial section, a concave profile that is substantially constant over the entire periphery of the slide valve.

6. The thermostatic cartridge according to claim 5, wherein the concave profile is more splayed on the side of the axial face of the slide valve associated with the corresponding hot or cold fluid inlet.

7. The thermostatic cartridge according to claim 1, wherein the hot channelling groove and the cold channelling groove are substantially symmetrical with each other with respect to a transverse mid-plane of the slide valve.

8. The thermostatic cartridge according to claim 1, wherein the slide valve is externally provided with guide means for guiding in movement the slide valve with respect to the casing, these guide means including studs that are distributed on the external periphery of the slide valve and extend radially projecting from at least one of or each of the hot and cold channelling grooves.

9. The thermostatic cartridge according to claim 1, wherein the flow passage is adapted to direct the cold fluid onto the hot fluid inlet.

10. A thermostatic cartridge for regulating hot and cold fluids to be mixed, comprising:
   a casing that is hollow, defines axis and delimits an outlet for a mixture of the hot and cold fluids,
   a slide valve for regulating the temperature of the mixture, which:
      has two opposite axial faces,
      delimits internally a flow passage that connects the axial faces to each other and through which one of the hot and cold fluids joins the other fluid in the direction of the outlet in order to form the mixture, and
      is movable substantially along the axis with respect to the casing so as to inversely vary the respective flow sections of a cold fluid inlet, delimited axially between the casing and one of the axial faces, and a hot fluid inlet, delimited axially between the casing and the other axial face, and
   a thermostatic element that comprises a piston, connected to the casing, and a body secured to the slide valve, the piston and the body being able to move with respect to each other substantially along the axis under the action of an expansion of a heat-expandable material contained in the body along a thermosensitive part from which the mixture flows downstream from the slide valve,
   wherein the slide valve delimits externally:
   a hot channelling groove for channelling the hot fluid, which is adapted to distribute the hot fluid supplying the hot fluid inlet over the entire external periphery of the slide valve and defines a hot free space for circulating the hot fluid around the slide valve, the hot free space being equal to or greater than the maximum volume of fluid that is permitted in service by the hot fluid inlet, or
   a cold channelling groove for channelling the cold fluid, which is adapted to distribute the cold fluid supplying the cold fluid inlet over the entire external periphery of the slide valve and defines a cold free space for circulating the cold fluid around the slide valve, the cold free space being equal to or greater than the maximum volume of fluid that is permissible in service through the cold fluid inlet.

11. The thermostatic cartridge according to claim 10, wherein the hot or cold channelling grooves emerges both:
   axially on the external periphery of the axial face of the slide valve, associated with the corresponding hot or cold fluid inlet, and
   radially on the end part, turned axially towards said axial face, of the external lateral face of the slide valve.

12. The thermostatic cartridge according to claim 11, wherein the hot or cold channelling grooves has a maximum radial dimension that is equal to at least 5% of the maximum transverse dimension of the slide valve.

13. The thermostatic cartridge according to claim 11, wherein at least one of or each of the hot and cold channelling grooves has, at its outlet on the external lateral face of the slide valve, an axial dimension that is equal to at least 40% of the total axial dimension of the slide valve.

14. The thermostatic cartridge according to claim 10, wherein the hot or cold channelling grooves has, in axial section, a concave profile that is substantially constant over the entire periphery of the slide valve.

15. The thermostatic cartridge according to claim 14, wherein the concave profile is more splayed on the side of the axial face of the slide valve associated with the corresponding hot or cold fluid inlet.

16. The thermostatic cartridge according to claim 10, wherein the slide valve is externally provided with guide means for guiding in movement the slide valve with respect to the casing, these guide means including studs that are distributed on the external periphery of the slide valve and extend radially projecting from the hot or cold channelling grooves.

17. The thermostatic cartridge according to claim 10, wherein the flow passage is adapted to direct the cold fluid onto the hot fluid inlet.

\* \* \* \* \*